United States Patent [19]
Eisenhaure et al.

[11] Patent Number: 4,617,507
[45] Date of Patent: Oct. 14, 1986

[54] SELF-REGULATING ENERGY STORAGE SYSTEM

[75] Inventors: David B. Eisenhaure, Hull; James R. Downer, Cambridge; Tim E. Bliamptis, Lexington; George A. Oberbeck, East Walpole, all of Mass.; Susan D. Hendrie, Milan, Italy

[73] Assignee: The Charles Stark Draper Laboratory, Inc., Cambridge, Mass.

[21] Appl. No.: 683,373

[22] Filed: Dec. 19, 1984

[51] Int. Cl.$^4$ .............................................. H02K 7/02
[52] U.S. Cl. ....................................... 322/4; 323/906; 322/DIG. 5
[58] Field of Search .................... 322/4; 323/201, 906; 307/47, 68

[56] References Cited
U.S. PATENT DOCUMENTS
4,468,569  9/1984  Norris .............................. 323/906 X Primary Examiner—Patrick R. Salce
Assistant Examiner—Mark D. Simpson
Attorney, Agent, or Firm—Joseph S. Iandiorio; William E. Noonan

[57] ABSTRACT

A self-regulating energy storage system including: an a.c. motor/generator including a rotor; a flywheel attached to the motor/generator; a device for monitoring the position of the motor/generator rotor; an element for resolving current to and from the motor/generator; a pulse width modulated bidirectional inverter interconnecting the motor/generator with a power supply bus to be regulated; a summing circuit for determining differences between a reference voltage and the voltage in the power supply bus to be regulated; and a pulse width modulation switch control responsive to the comparator circuit, to the device for monitoring, and to the element for resolving, for actuating the inverter to increase pulse width as a function of increase in the difference between the reference voltage and the voltage on the bus, and to increase current to the motor/generator in the motor direction when the bus voltage exceeds the reference voltage and to increase current from the motor/generator in the generator direction when the reference voltage exceeds the bus voltage.

5 Claims, 4 Drawing Figures

FIG. I

SELF-REGULATING ENERGY STORAGE SYSTEM

FIELD OF INVENTION

This invention relates to an inertial energy storage system, and more particularly to such a system which is self-regulating.

BACKGROUND OF INVENTION

Batteries, coupled with an electronic regulator, are a conventional energy storage device where energy from unregulated power supplies may be stored and regulated. In applications where the ratio of weight and/or volume to energy storage capacity, and absolute weight and volume, are critical, such as satellite systems, batteries are generally a disadvantage. This is especially so if the batteries will be required to undergo frequent deep discharging and re-charging. Deep discharging and re-charging severely shortens the life of batteries. One approach is to use more battery capacity so that the discharge will be less deep. However, this solution increases the system weight and volume. Batteries also suffer from the shortcoming that they are untestable as to their state of charge: the only true test of a battery's power is to apply a load across its terminals and thus waste the stored energy. This is an unacceptable situation in satellite systems.

SUMMARY OF INVENTION

It is therefore an object of this invention to provide an improved energy storage system which is lighter and smaller.

It is a further object of this invention to provide such an energy storage system which has a high ratio of energy storage to weight/volume.

It is a further object of this invention to provide such an energy storage system which is capable of more than 100,000 cycles of discharging and recharging.

It is a further object of this invention to provide such an energy storage system which is capable of deep discharging and recharging without sacrificing life expectancy.

It is a further object of this invention to provide such a system which is self-regulating.

It is a further object of this invention to provide such a system which is easily testable for energy content.

The invention results from the realization that an extremely efficient and compact energy storage system can be made by using a motor/generator to store energy in a flywheel during surplus power conditions and return it during low power conditions and using pulse width modulation to increase and decrease the power flow to and from the motor/generator to regulate the available voltage.

This invention features a self-regulating energy storage system including an a.c. motor/generator, having a rotor, and a flywheel forming at least a part of the motor/generator. There are means for monitoring the position of the rotor of the motor/generator and means for resolving current to and from the motor/generator. A pulse width modulated bidirectional inverter interconnects the motor/generator with a power supply bus having a voltage to be regulated. A summing circuit determines differences between a reference voltage and the voltage in the power supply bus to be regulated. A pulse width modulation switch control responsive to the output of the summing circuit and to the means for monitoring actuates the inverter to increase pulse width as a function of increase in the difference between the reference voltage and the voltage on the bus, and to increase current to the motor/generator in the motor direction when the bus voltage exceeds the reference voltage, and to increase current from the motor/generator in the generator direction when the reference voltage exceeds the bus voltage.

In a preferred embodiment the flywheel is made from a composite material including aluminum and boron in the form of filaments that are oriented circumferentially in the flywheel. The means for monitoring includes a pole sensor which develops a commutating signal for switching current flow to and from the motor/generator. The motor/generator has three phases and the means for resolving resolves current in each phase.

DISCLOSURE OF PREFERRED EMBODIMENT

Other objects, features and advantages will occur from the following description of a preferred embodiment and the accompanying drawings, in which.

The self-regulating energy storage system according to this invention may be used in a satellite which may for example have power supplied through a photovoltaic array for only fifty-five minutes of a ninety minute orbit. An a.c. motor generator device according to this invention has a flywheel attached to it for storing energy during motor operation and for returning the energy during generator operation. A pulse width modulated bidirectional inverter interconnects the motor/generator with a power supply bus having a voltage to be regulated. A summing circuit determines the difference between the reference voltage and the voltage on the power supply bus to be regulated. There is also some means such as one or more Hall effect devices for monitoring the pole positions on the motor/generator rotor for each phase of the motor/generator. A means such as a precision series resistor resolves that is, senses of measures the current in each phase of the motor/generator. A pulse width modulation switch control uses the commutation signal from the Hall effect device in conjunction with the signals from the summing circuit and current sensors to control the magnitude and direction of current flow and the pulse width variation in the inverter. The inverter is driven to increase the pulse width in order to increase current to or from the motor/generator as a function of increasing difference between the reference voltage and the voltage on the bus. The inverter also increases the current to the motor/generator in the motor direction when the bus voltage exceeds the reference voltage and increases current from the motor generator in the generator direction when the reference voltage exceeds the bus voltage.

Figure 1:
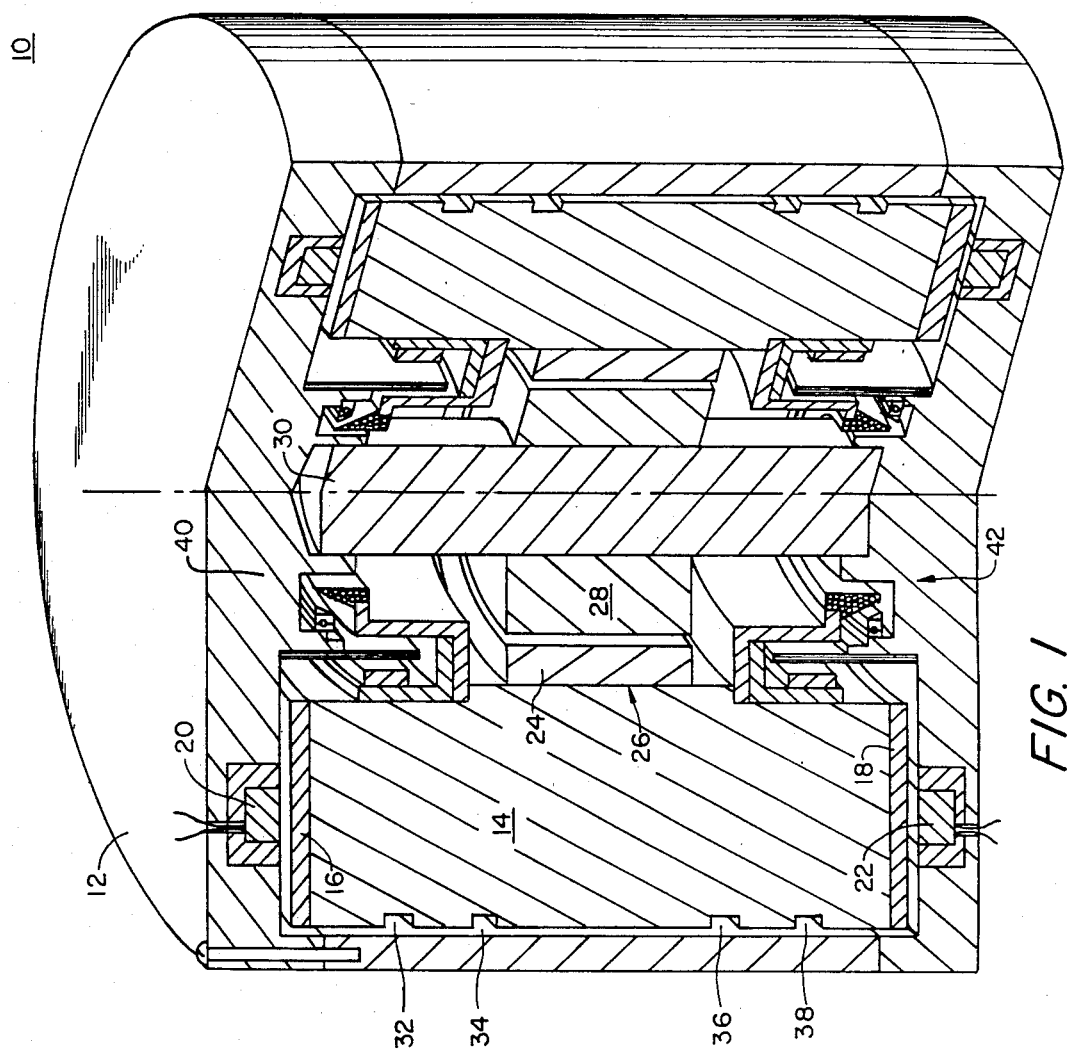
FIG. 1 is an axonometric view with a portion broken away of a motor/generator storage device according to this invention.

There is shown in FIG. 1 an energy storage motor/generator flywheel device 10 which includes a housing 12 in which is rotatable a non-magnetic flywheel 14. At either end of flywheel 14 there are magnetic plates 16 and 18 which interact with electrically controlled annular locking magnets 20, 22 for securing the flywheel rotor 14 when the system is subjected to large vibrations or shock loads. Flywheel 14 is attached to the rotor 24 of motor 26, which also includes stator portion 28 mounted on stationary center shaft 30. Grooves 32, 34, 36 and 38 cooperate with printed circuit material to form a flywheel position sensor. Device 10 includes two magnetic bearings 40, 42.

Figure 2:
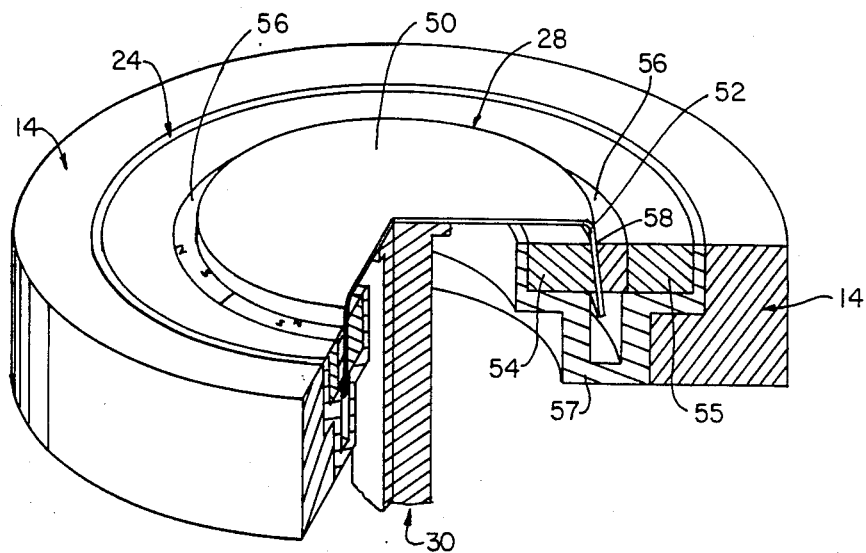
FIG. 2 is an enlarged axonometric partially broken away sectional view of the motor/generator of FIG. 1.
Figure 3:
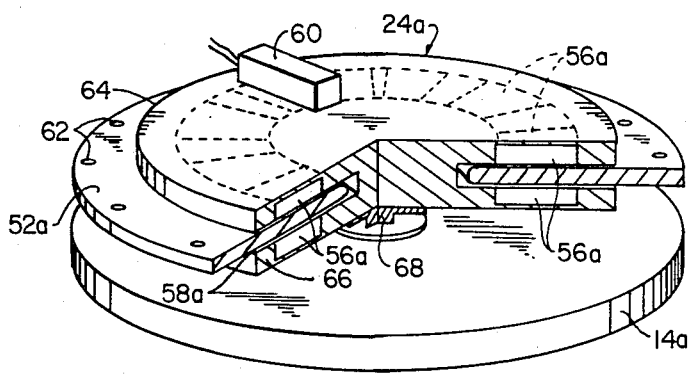
FIG. 3 is an axonometric view with portions broken away and in section of an alternative construction of a motor/generator.

Motor 26 is shown only schematically in FIG. 1 as having two parts, a rotor 24 and stator 28. These parts are shown in more detail in FIG. 2, where it can be seen that stator 28 includes a plate 50 which supports stator coils 52. Rotor 24 includes two cores of magnetic material 54, 55 such as vanadium permendur mounted on non-magnetic support 57, of a material such as aluminum, and including a plurality of circumferentially spaced radially extending permanent magnets 56. A gap 58 in rotor 24 accommodates stator coils 52. Attached to the outside of rotor 24 is flywheel 14, which is formed from a combination of boron and aluminum which is 40–60% boron and 60–40% aluminum by volume. The boron is in the form of filaments whose average diameter is 0.006 inch and which are oriented circumferentially in the flywheel. Flywheel 14 and shaft 30 have been truncated flush with the top of rotor 24 for ease of illustration only: as can be seen from FIG. 1 both of these parts extend well above rotor 24. For purposes of developing a commutating signal to be used for switching the current flow to and from the motor/generator 26, a device may be used to detect the position of permanent magnets 56 as they rotate. For a three-phase motor/generator, this may be done with three photoelectric elements and indicia on rotor 24, three tuned E-cores, or by means of three Hall effect devices, such as device 60 shown in FIG. 3, which will directly detect the magnetic fields of the poles. Hall effect device 60 is shown in FIG. 3 in conjunction with an alternative embodiment of motor 26a, in which the stator coils are in the form of a disc 52a with holes 62 for mounting. Rotor 24a includes an upper and a lower portion 64 and 66 which are fixed on shaft 68 to rotate with disc-shaped flywheel 14a. Stator coil disc 52a is received in gap 58a of rotor 24a. There are magnets 56a in both the upper and lower portions 64, 66 of rotor 24a.

Figure 4:
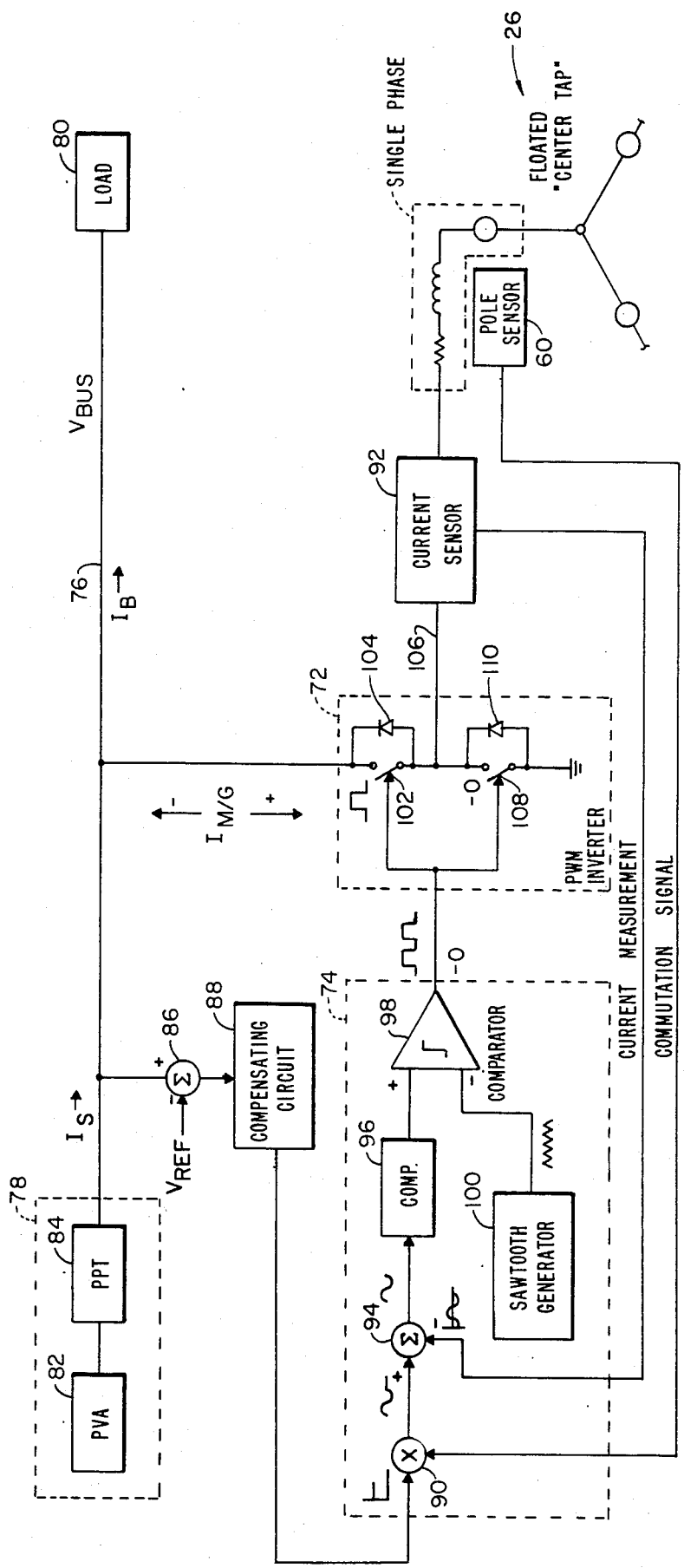
FIG. 4 is a schematic block diagram of a controller circuit for use in the self-regulating energy storage system to operate the motor/generator device.

The electrical elements of self-regulating energy storage system 70, FIG. 4, according to one embodiment include three-phase motor/generator 26, pole sensor 60, and a pulse width modulation bidirectional inverter 72 which is driven by a pulse width modulation (PWM) switch control 74. For simplicity of presentation, only one phase of PWM inverter 72 and PWM switch control 74 is shown. Inverter 72 interconnects motor generator 26 with bus 76, the voltage on which is to be regulated. Bus 76 extends between an unregulated power supply 78 and a load 80. In a satellite system, unregulated power supply 78 may include a photovoltaic array 82 whose output is fed through a peak power tracker 84 to bus 76. The current, $I_S$, provided by power source 78 is either added to or subtracted from the motor/generator current $I_{M/G}$ to provide the resulting bus current $I_B$ to load 80. Summing circuit 86, which may be implemented by an operational amplifier, receives the reference voltage $V_{REF}$ at its negative input and the bus voltage $V_{BUS}$ at its positive input. Any difference between the two provides an output to compensating circuit 88 which stabilizes the system and provides conventional damping, filtering and shaping. The output of compensating circuit 88 is a command for affecting the magnitude and direction of the motor/generator current $I_{M/G}$. A positive difference output from summing circuit 86 and compensating circuit 88 indicates that the bus voltage is higher than the reference voltage, and so the current $I_{M/G}$ is increased in the motor direction to motor/generator 26. When the output of summing circuit 86 is negative that indicates that the bus voltage is lower than the reference voltage and so the motor/generator current $I_{M/G}$ will be decreased in the motor direction or increased in the generator direction depending upon which mode motor/generator 26 is operating in. In this way motor/generator 26 and rotor 14 function not only to store energy during peak power collection times and return it during low power collection times, but also act to regulate the voltage on bus 76.

The current command output of circuit 88 is multiplied at multiplier 90 by the commutation signal derived from pole sensor 60 which senses the rotor axis position about its spin axis in electrical degrees. Current sensor 92, such as a precision series resistor, measures current passing to and from the associated phase of motor/generator 26. The output of multiplier 90 is a sinusoidal signal whose frequency and phase angle are those of the commutation signal provided by sensor 60 and whose amplitude is proportional to the output of compensating circuit 88. The signal from sensor 92 is subtracted from the output of multiplier 90 in summing circuit 94. After submission to compensating circuit 96, the signal is provided to comparator circuit 98 along with a high-frequency signal from sawtooth generator 100. The output of comparator 98 is either zero or a predetermined positive level. If it is a positive level, then a semiconductor switch such as a field-effect transistor 102 with protector diode 104, is closed to direct the current $I_{M/G}$ through FET 102 and then through line 106 back into the monitored phase of motor/generator 26. If the output of comparator 98 is zero, then FET 108 is closed and the current is delivered along line 106 to ground.

The output of switching network 74 is a series of pulses applied in inverter 72. The greater the power input required to the motor or the greater the power output required from the generator, the wider is the pulse provided to inverter 72. Pulse width modulation switch control 74 therefore responds to the commutating signal output from pole sensor 60 and the current measurement from sensor 92 in order to switch the pulses in inverter 72 at the proper time. It also controls the variation of the width of the pulses in response to the difference voltage at the output of summing circuit 86. Thus there is provided an improved lighter, smaller energy storage device which has longer life and whose energy storage function is easily determinable by detecting flywheel rotation. The self-regulating feature is established by using a pulse width modulation bidirectional inverter and switch control to supervise the current flow to and from the motor/generator and to modify the pulse width in accordance with load demands and power source variations, as indicated by bus voltage variations.

Other embodiments will occur to those skilled in the art and are within the following claims.

What is claimed is:
1. A self-regulating energy storage system comprising:
 an a.c. motor/generator including a rotor;
 a flywheel attached to said motor/generator;

means for monitoring the position of the motor/generator rotor;

means for resolving current to and from said motor/generator;

a pulse width modulated bidirectional inverter interconnecting said motor/generator with a power supply bus having a voltage to be regulated;

a summing circuit for determining differences between a reference voltage and the voltage on the power supply bus to be regulated; and a pulse width modulation switch control responsive to said summing circuit, to said means for monitoring, and to said means for resolving, for actuating said inverter to increase pulse width as function of increase in the difference between the reference voltage and the voltage on the bus and to increase current to said motor/generator when the bus voltage exceeds the reference voltage and to increase current from said motor/generator when the reference voltage exceeds the bus voltage.

2. The system of claim 1 in which said flywheel is a boron/aluminum material.

3. The system of claim 2 in which said material includes boron filaments oriented circumferentially in said flywheel.

4. The system of claim 1 in which the means for monitoring includes, for each motor/generator unit, a pole sensor which develops a commutating signal for switching current flow to and from the motor/generator.

5. The system of claim 1 in which the motor/generator has three phases and the means for resolving resolves current in each phase.

* * * * *